US006529164B1

(12) United States Patent
Carter

(10) Patent No.: US 6,529,164 B1
(45) Date of Patent: Mar. 4, 2003

(54) OBJECT LOCATION MONITORING WITHIN BUILDINGS

(75) Inventor: Scott J. Carter, Seal Beach, CA (US)

(73) Assignee: GE Medical Systems Information Technologies, Inc., Milwaukee, WI (US)

( * ) Notice: Subject to any disclaimer, the term of this patent is extended or adjusted under 35 U.S.C. 154(b) by 0 days.

(21) Appl. No.: 09/822,122

(22) Filed: Mar. 30, 2001

Related U.S. Application Data

(60) Provisional application No. 60/193,655, filed on Mar. 31, 2000.

(51) Int. Cl.[7] .............................................. G01S 3/02
(52) U.S. Cl. ...................... 342/463; 342/464; 342/385
(58) Field of Search ................................ 342/463, 464, 342/465, 385, 386

(56) References Cited

U.S. PATENT DOCUMENTS

| 5,119,104 A | 6/1992 | Heller |
| 5,365,516 A | 11/1994 | Jandrell |
| 5,396,224 A | 3/1995 | Dukes et al. |
| 5,446,701 A | 8/1995 | Utke et al. |
| 5,661,492 A | * 8/1997 | Shoap et al. ............. 342/465 |
| 5,944,659 A | 8/1999 | Flach et al. |
| 6,104,295 A | 8/2000 | Gaisser et al. |
| 6,150,921 A | 11/2000 | Werb et al. |
| 6,154,139 A | 11/2000 | Heller |
| 6,222,440 B1 | 4/2001 | Heller |

FOREIGN PATENT DOCUMENTS

| WO | WO 98/16849 | 4/1998 |
| WO | WO 99/67737 | 12/1999 |
| WO | WO 00/52498 | 9/2000 |
| WO | WO 01/06401 A1 | 1/2001 |
| WO | WO 01/15070 A2 | 3/2001 |

OTHER PUBLICATIONS

A. Ward, A. Jones and A. Hopper, "A New Location Technique for the Active Office," IEEE Personal Communications, vol. 4, No. 5, pp. 42–47, dated Oct. 1997. (copy printed from ffp.uk.research.att.com site).
R. Want, A. Hopper, V. Falcao and J. Gibbons, "The Active Badge Location System," ACM Transactions on Information Systems, vol. 10, No. 1, pp. 91–102, dated Jan. 1992.

* cited by examiner

Primary Examiner—Theodore M. Blum
(74) Attorney, Agent, or Firm—Foley & Lardner; Carl B. Horton

(57) ABSTRACT

An object location monitoring system tracks the locations of portable transceivers that attach to movable objects, such as patients within a hospital. The system preferably tracks the locations of the transceivers by combining a signal strength based locating process with a topological tracking process. Beacons that intermittently transmit unique ID codes are mounted to walls or other structures throughout a building, and are maintained in synchronization using the 60 Hz cycle of a standard 120V AC power signal, either directly or by monitoring flicker of fluorescent lighting. The transceivers receive the transmissions of nearby beacons, determine the signal strengths of such transmissions, and forward associated data to a server. The server uses this data to determine the location of each transceiver, and uses expected travel times between specific locations to resolve ambiguities. In a preferred embodiment, the transceivers are ambulatory transceivers that also sense and transmit physiologic data of patients.

28 Claims, 9 Drawing Sheets

| LOCATION / TWO BEACONS WITH HIGHEST RSSI | ROOM 1 | HALL | ROOM 2 |
|---|---|---|---|
| | B1, B2 | B1, B2 OR B3, B4, OR B2, B3, OR B2, B4 | B3, B4 |

Fig. 7

| LOCATION / LOCATION | ROOM 1 | HALL | ROOM 2 |
|---|---|---|---|
| ROOM 1 | X | 5 | 10 |
| HALL | 5 | X | 5 |
| ROOM 2 | 10 | 5 | X |

Fig. 8

OBJECT LOCATION MONITORING WITHIN BUILDINGS

RELATED APPLICATION

This application claims the benefit of U.S. provisional application no. 60/193,655, filed Mar. 31, 2000.

BACKGROUND OF THE INVENTION

1. Field of the Invention

The present invention relates to object location monitoring within or around buildings. More particularly, the present invention relates to systems and methods for monitoring the locations of transceivers or transponders that may be attached to a patient or other movable object.

2. Description of the Related Art

Various approaches have been proposed for monitoring the locations of objects within an area. One such approach uses radio frequency (RF) transmitters or tags, attached to the objects to be tracked, and an array of receivers for receiving tag transmissions throughout a tracking area. The signal strengths of the received tag transmissions may then be used to determine a tag's distance from the receivers. One problem with this approach is that it is not well suited for monitoring the locations of objects within a building having multiple rooms. In such an environment, the unpredictable attenuation of transmissions passing through walls and other structures, and the effects of multi-path distortion, make signal strength only marginally useful as a parameter for determining distance.

One solution to this problem, proposed in U.S. Pat. No. 5,119,104 to Heller, involves accurately measuring the time of arrival of the tag transmission at each of multiple receivers. This time of arrival data is then used in combination to determine the location of the tag. A significant problem with this approach is that a high degree of synchronization is required between the receivers to produce accurate results. As a result, such a system tends to be difficult and expensive to implement.

SUMMARY OF THE INVENTION

In accordance with the invention, an object location monitoring system tracks the locations of portable, wireless transceivers that attach to movable objects, such as patients within a hospital. The system preferably tracks the locations of the transceivers by combining a signal strength based locating process with a topological tracking process. The transceivers can be any type of data processing device capable of sending and receiving data by RF, including transponders.

In a preferred embodiment, chirpers or "beacons" that intermittently transmit unique ID codes are mounted to walls or other structures throughout areas of a building. The beacons are preferably maintained in coarse synchronization such that nearby beacons do not transmit simultaneously. In accordance with one aspect of the invention, the beacons are synchronized using the 60 Hz cycle of a standard 120V AC (alternating current) power signal within the building—either by monitoring the power signal directly or by monitoring the flicker of the lighting within the building. Two or more beacons are preferably provided in different locations within each room to reduce ambiguities and the effects of signal blockage.

Each transceiver records the beacon IDs, and determines the received signal strengths, of the beacon transmissions it detects. The received signal strength establishes a maximum plausible distance between the beacon and the transceiver, based on the assumption that the received signal strength decreases with at least the second power of the distance as in free space propagation. The transceivers preferably forward some or all of this information to a server or other processing node. The processing node uses this information, together with information about expected received signal strengths in specific areas, to predict the current location of each transceiver. Any ambiguities in the location data are preferably resolved using the topological tracking process. The topological tracking process preferably uses predetermined information about the minimum times an object may take to move from one location to another. The topologic tracking process may also use rules regarding plausible state transitions; for example, if a transceiver was very recently determined to be in room 1, and there is object locator coverage in the hallway that provides the only path from room 1 to room 2, the system may treat a direct transition from room 1 to room 2 (without intermediate detection in the hallway) as suspect or invalid.

In one particular embodiment, the transceivers are remote patient transceivers or telemeters used to monitor and transmit patient vital signs data within a medical facility. These devices are typically portable, battery-powered devices configured to be worn by respective patients. In a TDMA (time division multiple access) implementation, each patient transceiver transmits the patient's physiologic data to a receiving station according to a TDMA protocol. Each patient transceiver additionally listens for beacon transmissions during TDMA time slots that are not otherwise used by that patient transceiver, and records the beacon IDs and received signal strengths of the detected beacon transmissions. The patient transceiver forwards some or all of this information about the received beacon transmissions to a server or other processing node preferably using a link established with an access point for telemetry purposes. The processing node uses this information together with a set of tables to determine the transceiver's location.

Although the process used to determine the locations of the transceivers is preferably executed by a central server or processing node, the process could alternatively be implemented within the transceivers themselves (i.e., each transceiver determines its own respective location), or within network access points with which the transceivers communicate.

BRIEF DESCRIPTION OF THE DRAWINGS

These and other features of the invention will now be described with reference to the following drawings of a preferred embodiment of the invention.

FIG. 7 illustrates a signal strength table that stores information about expected received signal strengths of beacon transmissions for each of multiple areas within the structure.

FIG. 8 illustrates a travel time table for movement of a transceiver from one location to another.

DETAILED DESCRIPTION OF THE PREFERRED EMBODIMENT

The structure and operation of a system in accordance with the present invention are illustrated below. In the particular embodiment illustrated, the preexisting infrastructure of a medical telemetry system (remote patient transceivers, access points, LAN, etc.) are used to monitor locations of patients within a medical facility. As will be apparent, the invention may also be implemented using other types of preexisting infrastructure, such as the general-purpose wireless LAN infrastructure of a building (e.g., to track laptop computers and other wireless computing devices). In addition, the invention may be implemented using special purpose transceivers and other components designed specifically for object location monitoring. Thus, the description of this particular embodiment is intended to illustrate, and not limit, the scope of the present invention.

Figure 1:
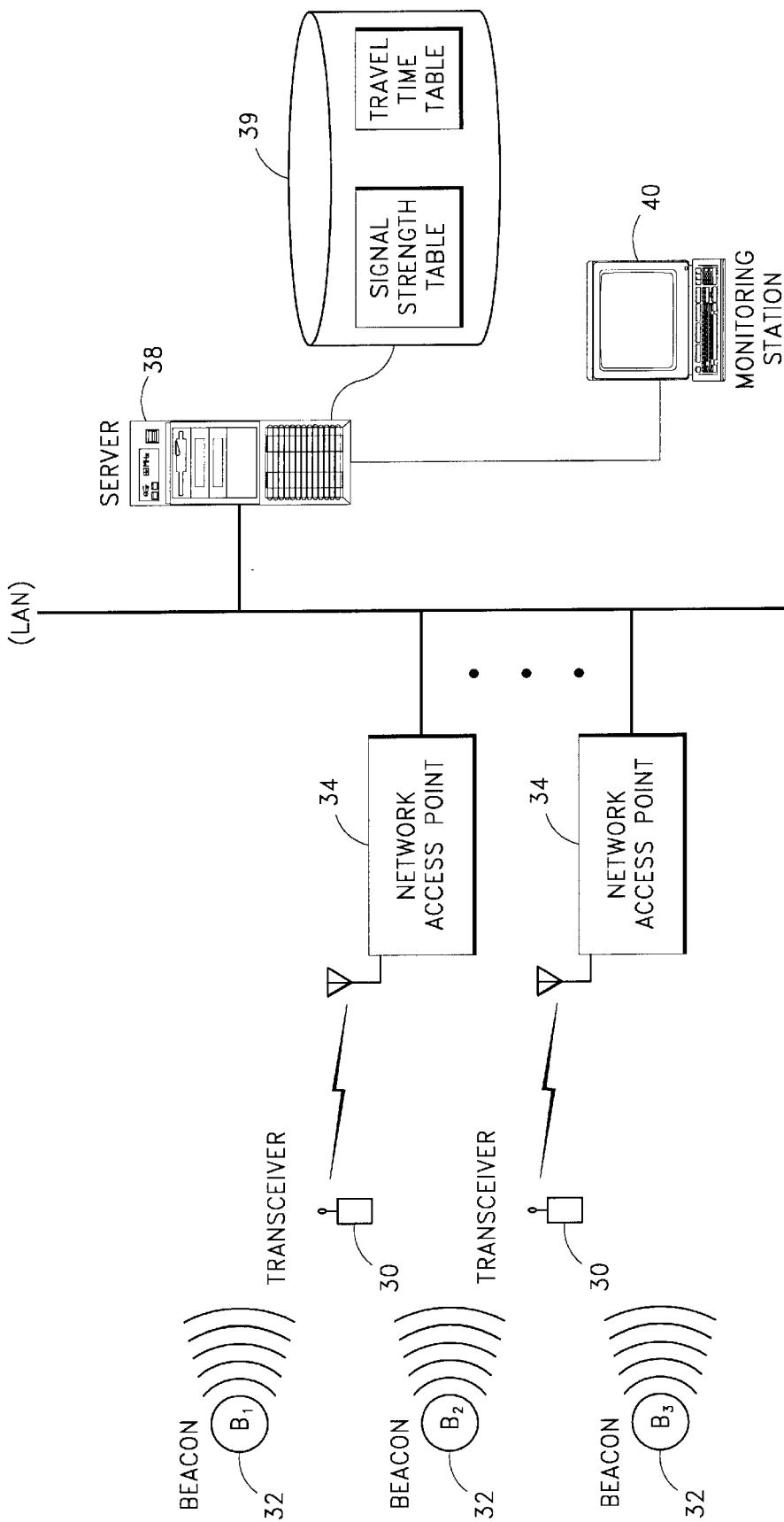
FIG. 1 depicts the components of an object location monitoring system according to a preferred embodiment of the invention.

FIG. 1 illustrates the components of a medical telemetry system that embodies the present invention. The medical telemetry system may, for example, have an architecture of the type described in U.S. Pat. No. 5,944,659, and/or co-pending application No. 09/615,362 filed Jul. 13, 2000, the disclosures of which are hereby incorporated by reference. The drawing is also illustrative of how the invention may be implemented for non-telemetry applications.

The components of the system include wireless transceivers 30 that attach to objects to be tracked, intermittent transmitters 32 (referred to as "chirpers" or "beacons") mounted to walls or other structures throughout areas of or around a building, network access point modules ("access points") 34 that provide wireless access to a wired LAN, and a server 38 or other central processing node that implements a location tracking process using data received from the transceivers 30. The system may also include one or more monitoring stations 40 that display the real time location data generated by the server 38.

In a preferred embodiment, the transceivers 30 are ambulatory or other portable remote patient transceivers of the type available from VitalCom, Inc. and other suppliers of medical telemetry equipment. Each such battery-powered device 30 attaches to a patient, and senses and transmits the patient's physiologic data (typically including electrocardiograph waveforms). This data is received by an access point 34 and is made available for real time monitoring on the LAN. In other embodiments, the transceivers 30 may be any other type of device capable of receiving and transmitting data in RF, such as transponder devices, wireless personal digital assistants (PDAs), two-way pagers, two-way voice radios, laptop computers equipped with wireless modems, or location tracking transponders adapted to be attached to objects.

The access points 34 are wireless transceiver devices that are hardwire-connected to the wired LAN. Examples of access point devices that may be used for this purpose include the VCELL devices described in above-referenced U.S. Pat. No. 5,944,659, and the multi-purpose access points described in the above-referenced application No. 09/615,362. General purpose wireless LAN access points that use Ethernet-type protocols may also be used. Although a wired LAN with access points 34 is preferred, another type of communication system could be used to relay location-related data from the transceivers 30 to the server, such as a wireless LAN or a distributed antenna array.

As is common in medical telemetry systems, the access points 34 are spatially distributed throughout the medical facility or other structure to provide overlapping zones or cells of coverage. As a patient transceiver 30 is moved from one cell to another, the transceiver 30 typically drops its connection with one access point 34 and establishes a connection with another so as to maintain connectivity to the wired LAN. Wireless communications between the transceivers 30 and the access points 34 may, but need not, be in accordance with a TDMA protocol. The access points 34 route the data they receive from the transceivers 30 onto the LAN to the server and/or other network entities.

The beacons 32 are preferably small, low-cost, low power transmitter devices that may be affixed to the walls or other stationary structures within a building. These devices transmit periodic beacon identification signals that are received by nearby transceivers 30. Each beacon 32 transmits its signal intermittently at a fixed or predefined RF power level. As discussed below, a transceiver 30 that receives a beacon transmission measures the received signal strength of the transmission. The transceiver subsequently transmits the signal strength measurement and the beacon's ID to an access point, preferably by "piggybacking" this data on a telemetry packet.

The location determination process is preferably executed by the network server 38 periodically, as may be required. Any other type of processing node could be used for this purpose (e.g., the access points 34 or the transceivers 30 themselves, as discussed below). The server 38 may, but need not, be a server used to store telemetry data (ECG waveforms, etc.) of patients. Object location data determined by the server 38 is made available on the LAN or otherwise for viewing or monitoring. For example, in medical telemetry embodiments, the patient location data may be displayed on one or more monitoring stations 40 in conjunction with corresponding physiologic data.

In operation, the beacons 32 intermittently transmit their respective ID signals according to a predefined timing pattern. These transmissions preferably occur on the same RF channel, which is preferably a frequency channel that is not used for telemetry of patient data. To avoid collisions, the beacons are preferably synchronized, and are preprogrammed such that nearby beacons do not transmit at the same time. Only coarse synchronization of the beacons is needed relative to other approaches, such as the approach described in the Heller patent referenced above.

More specifically, the beacons within a particular area are assigned to respective TDMA timeslots for purposes of transmitting their ID signals. These TDMA time slots preferably have no inherent relationship to the TDMA timeslots used for transmissions of physiologic data from the transceivers 30 to the access points 34.

In the preferred embodiment, the beacons are maintained in coarse or general synchronization using the phase of the power signals of the building's 120 volt, 60 Hz AC power lines. As described below, the phase of the power signal may be determined directly by monitoring the power signal itself, or indirectly by monitoring the corresponding flicker of the lighting within the buildings. In this embodiment, the beacons 32 are not be synchronized with the transceivers 30 or the access points 34, and advantageously do not require RF receivers.

In other embodiments, the beacons could be designed to monitor the transmissions of the access points 34, the transceivers 30, or each other to maintain synchronization. Further, the functionality of the beacons 32 could be incorporated into some or all of the access points 34 to reduce or even eliminate the need for separate beacon devices.

Each transceiver 30 listens for the transmissions of beacons 32, measures the received signal strengths of the detected transmissions, and accumulates (temporarily stores) the signal strength values together with the associated beacon IDs. Each transmitter 30 regularly retransmits some all of the stored received beacon IDs to an access point 34 with which a link is currently established, optionally together with RSSI (received signal strength indicator) values indicating the corresponding received signal strengths. These retransmission events may occur periodically or otherwise as part of a transceiver's normal transmission cycle. For example, in medical telemetry applications, when a patient transceiver 30 transmits a packet containing physiologic data, the IDs of the beacons 32 from which transmissions were received since the last packet transmission may be included within this packet. The transceivers 30 may alternatively retransmit the beacon IDs within dedicated packets.

Figure 9:
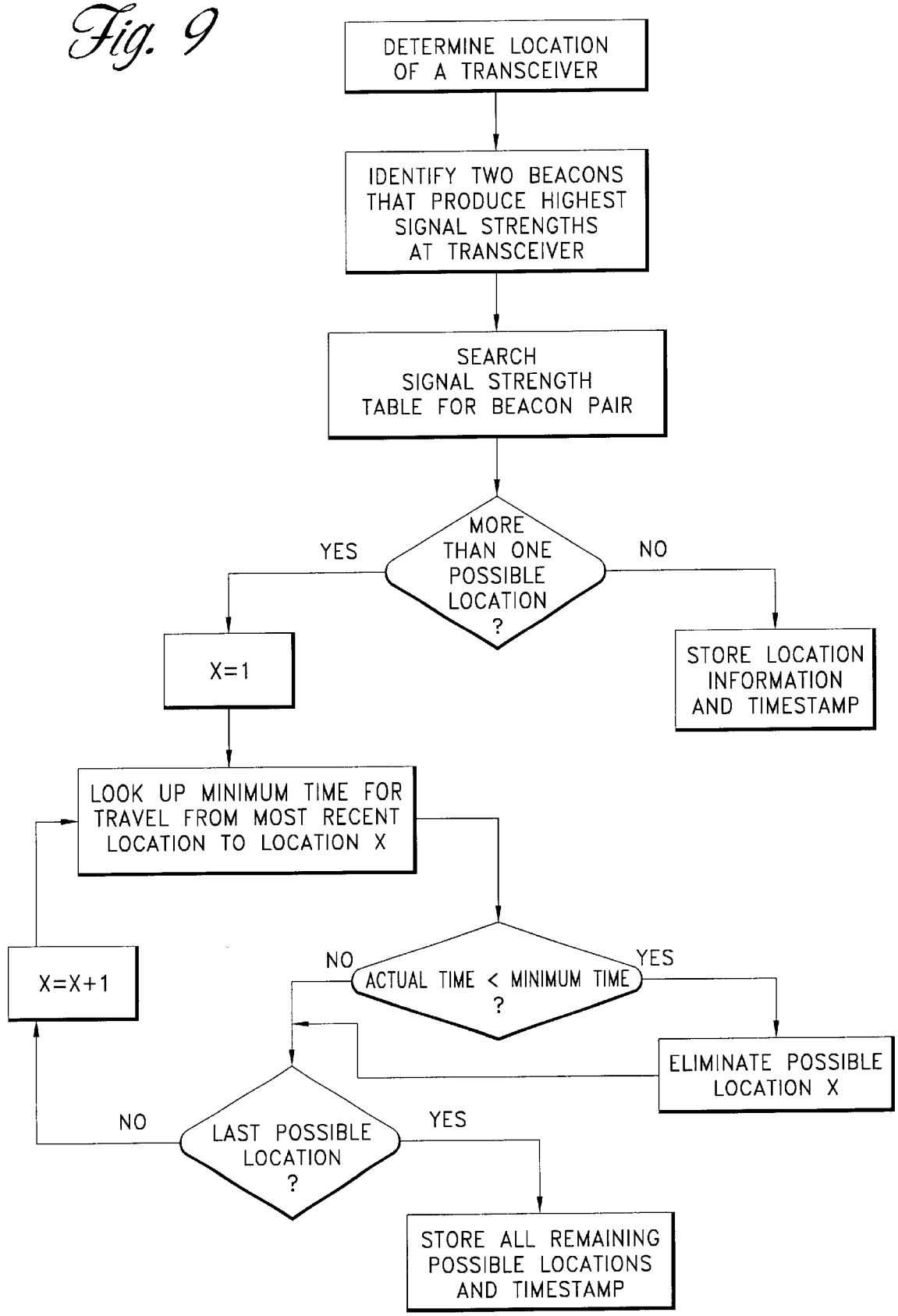
FIG. 9 illustrates the decision process used to identify the possible location of a transceiver based on received beacon signals.

In one embodiment, each retransmission includes the RSSI values, as determined by the transceiver 30, associated with the forwarded beacon ID signals. In another embodiment, the transceiver 30 selects the N (e.g., 2) beacons that produced the highest RSSI values, and only retransmits the IDs of these beacons. The access points 34 make the beacon data they receive from the transceivers 30 available to the network sever 38. The server 38 uses this data, in combination with a set of tables, to determine transceiver location. A preferred process for using the received data to determine a transceiver's location is illustrated in FIG. 9 and described below.

Figure 2:
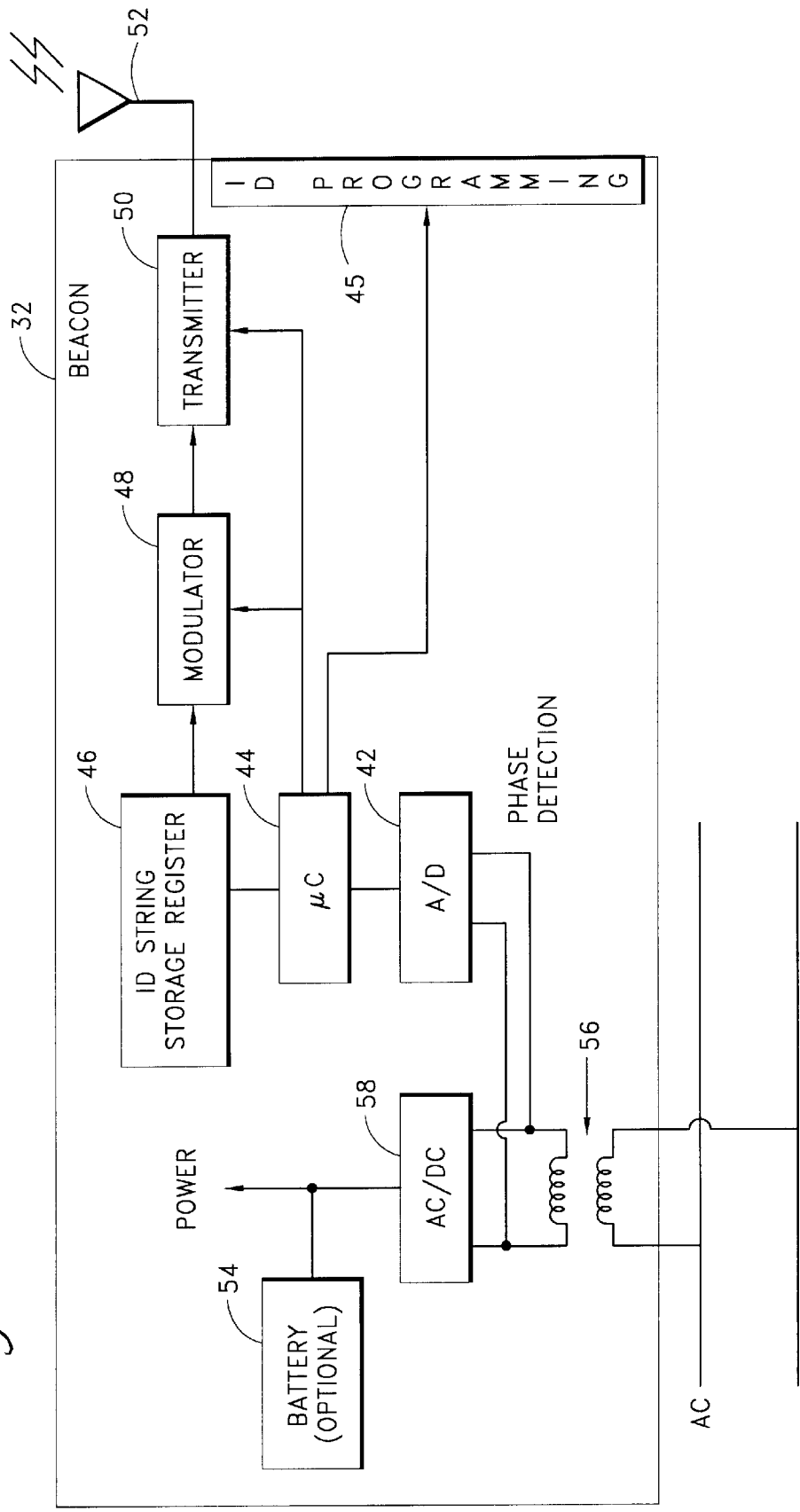
FIG. 2 is a schematic diagram of a chirper or beacon which receives power and maintains synchronization using the 60 Hz power signal from the standard AC power lines within a building.
Figure 3:
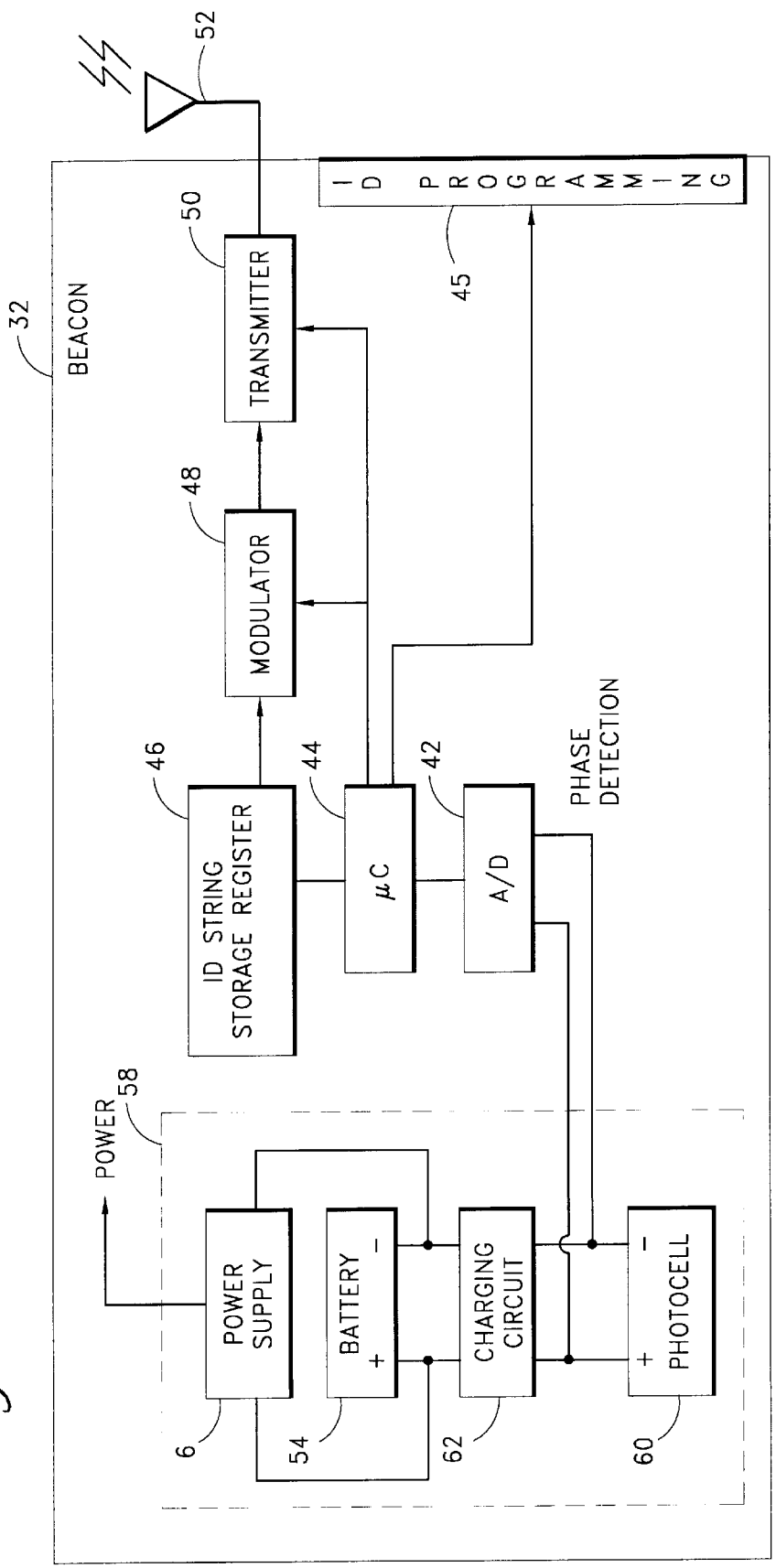
FIG. 3 illustrates a chirper or beacon that receives power and maintains synchronization using the fluorescent or other lighting commonly provided within hospitals and office buildings.

FIGS. 2 and 3 illustrate the designs of two different types of beacons 32 that may be used in the system of FIG. 1. The beacon shown in FIG. 2 is adapted to be connected to standard 120V AC power lines, and to use the 60 Hz power signal of these lines for both power and synchronization. The beacon shown in FIG. 3 is powered by the fluorescent or other lighting commonly used within medical facilities and office buildings, and uses the 60 Hz flicker of the lighting to maintain synchronization. Both types of beacons may be used within the same installation. As illustrated in FIGS. 2 and 3, each beacon includes an A/D (analog-to-digital) converter 42 for performing phase detection for beacon to beacon synchronization, a microcontroller 44 with built-in RAM and ROM, an ID string storage register 46, a modulator 48, a transmitter 50, an antenna 52, and a battery 54 (optionally omitted in the AC-power embodiment).

In the AC embodiment (FIG. 2), the beacon 321 also includes a power transformer 56 and an associated AC/DC converter 58 for converting the 120V AC power signal to an appropriate DC power signal. The DC power signal is used to power the active components of the beacon. The low-voltage side of the transformer 56 is connected to the input of the AID converter 42 to enable the microcontroller 44 to monitor the phase of the AC signal.

In the photovoltaic embodiment (FIG. 3), the transformer 56 and AC/DC converter 58 are replaced with a photoelectric power circuit 58. This circuit 58 comprises a photocell 60 having its outputs connected to the A/D converter 42 and a charging circuit 62. A lens, mirror, or other type of light-concentrating device (not shown) may be attached to or formed within the housing of the beacon 32 to focus light on the photoelectric cell 60. The charging circuit 62 charges the battery 54 when a sufficient amount of light energy is present. The terminals of the battery 54 are connected to a power supply circuit 64 which supplies DC power to the beacon's active components. The power supply 64 preferably includes a capacitor (not shown) or other energy-storing device for providing bursts of power during transmission events.

As illustrated in FIGS. 2 and 3, the beacon 32 also preferably includes an externally-accessible programming port or device 45, such as an infrared port, a serial data port, or a set of DIP switches, for programming each beacon with a unique ID. The unique IDs are stored in the ID string storage register 46, which may be a shift register or other appropriate type of storage device. The timing offsets used for specifying beacon transmission times may be derived by the beacons from their respective ID values, or may be separately specified during device programming. In one embodiment, orthogonal or other non-interfering codes are used to assign transmission periods to beacons that are sufficiently close in proximity to interfere with each other. The ID codes assigned during installation are preferably stored within a database 39 of the server 38 together with associated location information.

In operation, the A/D converter 58 converts the AC power signal (FIG. 2) or the photovoltaic signal (FIG. 3) to a digital signal that is processed by the microcontroller 44. The microcontroller 44 detects the peaks, troughs, and/or other cyclic events within this digital signal, and uses these events in combination with the preprogrammed timing offset data to determine when to commence a transmission. Some or all of these tasks may alternatively be performed by a special analog or digital circuit, without the use of a microcontroller.

During its assigned transmission period or timeslot, a beacon 32 transmits a data signal or packet comprising a preamble portion followed by a Forward Error Correction (FEC) encoded identification portion. The preamble preferably includes a synchronization sequence, such as a Barker code, followed by a training sequence. The identification portion comprises or is based on the beacon's ID code. The use of FEC encoding permits the transceiver 30 to successfully receive the beacon's ID string in the presence of bit errors in the reception process caused, for example, by interference or multipath distortion, or when slight differences in bit times exist between the beacon and the transceiver. Because the beacon ID string is a constant, the FEC encoding of the ID string can be pre-generated (e.g., during device programming or device powerup) and stored in the ID string register storage 46 with the beacon ID.

In one embodiment, the microcontroller 44 controls the modulator 48 and transmitter 50 primarily or solely using on/off control lines, and is thus not included in the transmission data path. In this embodiment, the ID string storage register 46 is preloaded with the entire packet (preamble and FEC encoded ID string). To transmit the packet, the data contained in the ID string register 46 is shifted or clocked out directly to the modulator 48 at the beacon's transmission rate. A function generator (not shown) may be used by the modulator 48 to convert the beacon's unique ID code to a periodic function. The type of modulation used will typically be dictated by the design of the transceivers 30, but may, for example, be GFSK (Gaussian Frequency Shift Keying), BPSK (Binary Phase Shift Keying), or π/4 DQPSK (π/4 Differential Quadrature Phase Shift Keying).

In one embodiment, each packet consists of a 32-bit preamble followed by a 32-bit identification portion, and the beacons transmit at a data rate of 230 Kb/sec or about 0.3 milliseconds per 64-bit packet. Thus, with a 60 Hz AC cycle of 16.6 milliseconds, about 50 beacons can co-exist in a single monitoring area. Greater numbers of beacons can be provided within a particular installation by assigning the same transmission slots to beacons that are sufficiently spaced apart, and/or by using more than one beacon transmission frequency.

The beacon antenna 52 is preferably configured to reduce the spill-over effect of the transmissions and to maximize the radiated power in the desired transmission region. For example, the antenna may be designed to radiate primarily outward, away from a wall to which the beacon is mounted and into the open space of the room. An electronic beamformer may additionally be used for this purpose.

In one embodiment, the transceivers 30 communicate with the access points 34 using a TDMA protocol in which timeslots of a TDMA frame are assigned by the access points 34 to the transceivers 30. During some or all of the timeslots for which a transceiver 30 is neither transmitting nor listening to an access point 34 (e.g., time slots assigned to other transceivers 30), the transceiver monitors the beacon frequency and records the IDs and signal strengths (RSSI values) of the detected beacon transmissions. The transceiver 30 thereafter includes some or all of this data in the next packet it transmits to an access point 34.

Figure 4:
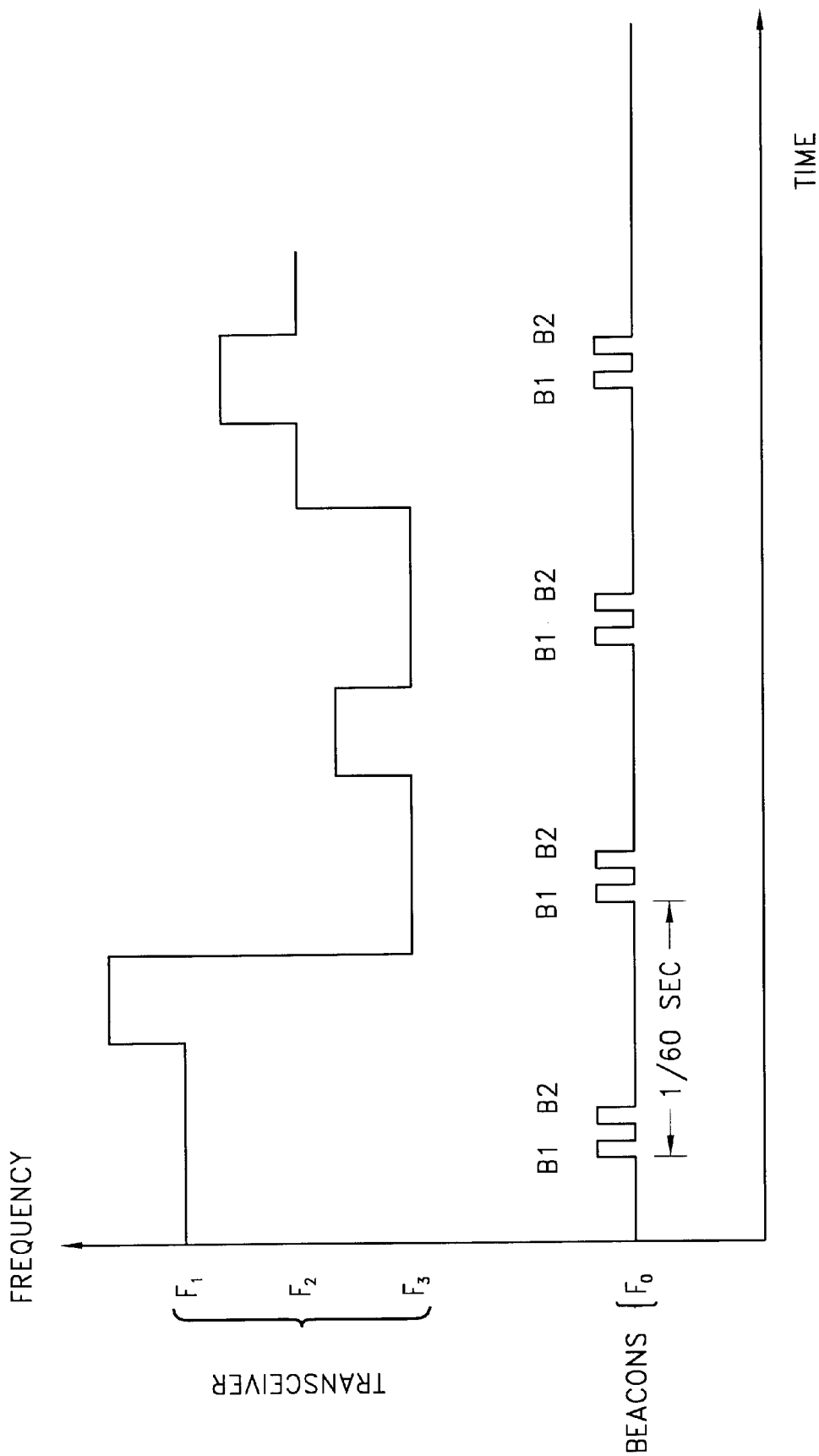
FIG. 4 illustrates the general transmission patterns of a beacon and of a patient transceiver in a medical telemetry system that uses frequency hopping.

In a frequency hopping implementation of the TDMA architecture, a particular frequency is reserved for beacon transmissions (i.e., is not included in the hopping sequences). This is schematically illustrated in FIG. 4, in which the top graph represents the hopping sequence of a singe transceiver 30 and the lower graph represents the periodic transmissions of two beacons 32, B1 and B2. A hopping sequence with only three frequencies, $F_1$, $F_2$ and $F_3$, is shown for purposes of illustration. As depicted in this figure, each beacon transmits once every 1/60 sec., and these transmissions are not synchronized with the TDMA frame used by the transceivers 30. During TDMA timeslots not otherwise used by the transceiver 30, the transceiver switches to $F_0$ (the beacon frequency) and listens for beacon transmissions.

In one embodiment, each transceiver 30 includes a motion sensor (not shown) to determine whether the object to which the transceiver is connected has moved since the last data transmission. In this embodiment, the transceiver listens for beacon transmissions only when motion is or has recently been detected. This allows the transceiver to operate in a lower power mode (e.g., as described in U.S. Pat. No. 5,748,103), and thus conserve battery power, when the object is stationary.

Figure 5:
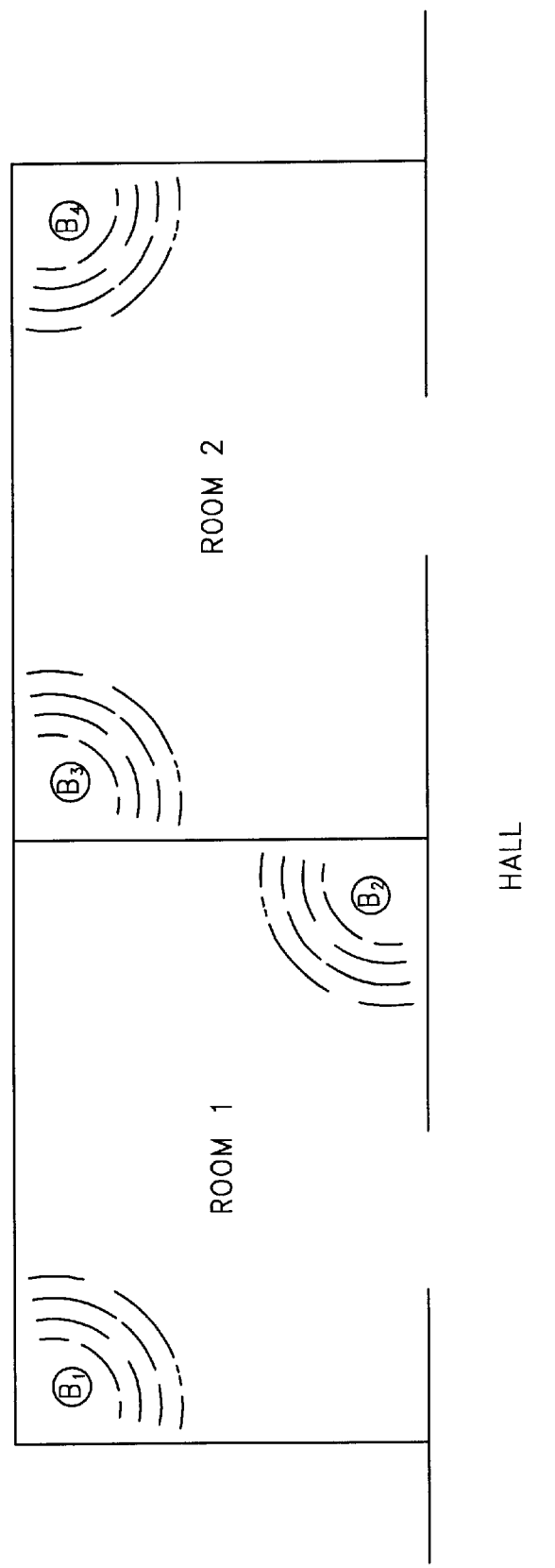
FIG. 5 illustrates a section of a structure in which beacons are mounted.

FIG. 5 illustrates the typical positions of beacons 32 within rooms of a building. The beacons are preferably spaced apart from one another and positioned generally at opposite sides or corners of each room. When photovoltaic beacons are used, each beacon is preferably mounted to a wall roughly one to four feet below the ceiling in an area such that is sufficiently illuminated by ceiling-mounted lights. The specific locations of the photovoltaic beacons may be selected based on light intensity measurements taken during installation, and other parameters.

Figure 6:
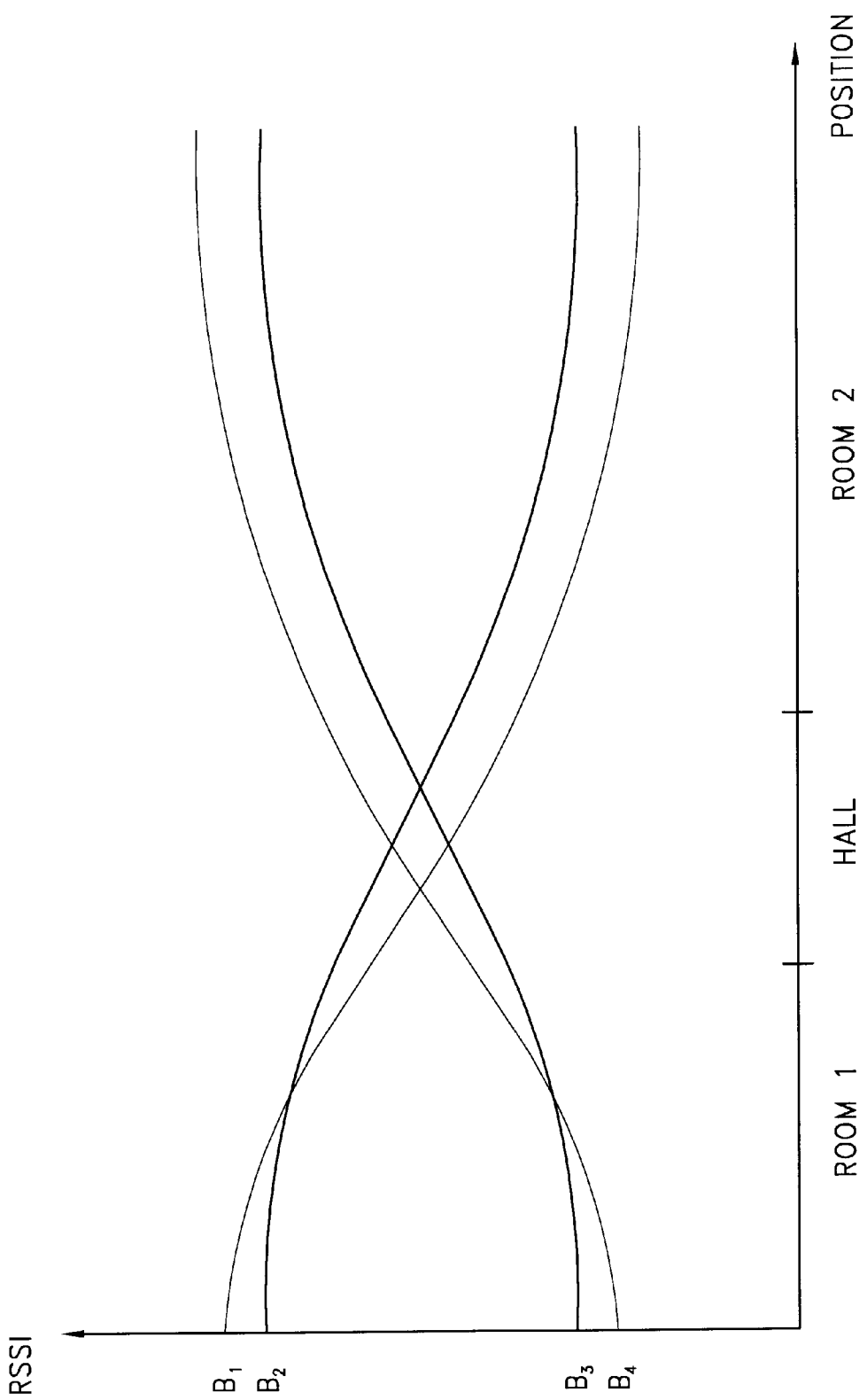
FIG. 6 illustrates the beacon signal strength levels received by a transceiver that is moving between rooms in the structure illustrated in FIG. 5.

FIG. 6 illustrates the signal strength levels of the beacon signals received by a transceiver 30 as the transceiver moves from room 1 to room 2 in FIG. 5. As illustrated, the signal strengths of the received beacon signals depend on the transceiver's location within the structure. For example, when the transceiver is in room 1, the strongest beacon signals are from beacons 1 and 2. On the other hand, when the transceiver is in room 2, the strongest beacon signals are from beacons 3 and 4. When the transceiver is in the hall, the strongest beacon signals are from beacons 1 and 2, beacons 2 and 3, or beacons 2 and 4, depending on the specific location within the hall.

The chart of FIG. 6 can be translated into a signal strength table that organizes the strongest beacon signal pairs according to the layout of the structure. FIG. 7 depicts one example of such a table. In this example, the table indicates the two beacons that produce the highest received signal strengths within each of three areas of the building: room 1, room 2, and the hall. A signal strength table of this type (but typically including a much greater number of areas and beacons) is preferably generated and stored in the database 39 during system installation or expansion. The table data may be generated, for example, by moving a transceiver 30 into each area in which location monitoring is desired while recording the IDs of the beacons with the highest signal strengths. Although the number of highest-signal-strength beacons recorded for each area is two in the FIG. 7 example, a different number of highest-signal-strength beacons may alternatively be recorded, such as one, three, four, or five. Further, actual signal strength ranges or other values may be stored in the table and used to more accurately predict transceiver location.

FIG. 8 illustrates a travel time table for movement of a transceiver 30 from one location to another. Preferably, the locations represented in the table are the same as those used in the signal strength table (FIG. 7). The travel time table is populated with values indicating the minimum estimated time required for an object to which a transceiver is attached to travel between pairs of locations. For example, as illustrated, the minimum time for movement from room 1 to room 2 is 10 seconds. A travel time table of this type may be generated and stored in the database 39 based on distances between the locations, expected maximum speeds of objects, and other factors such as whether obstructions to movement exist. For patient monitoring applications, the data may also be generated by measuring the amount of time it takes to walk between each pair of locations. The travel table could also store travel time data which is specific to the type of object being tracked (patient, capital equipment, etc.).

FIG. 9 illustrates the decision logic or process preferably used by the server 38 to identify the possible location of a transceiver 30 based on received beacon signals. This process may be incorporated into a software routine which is executed periodically (e.g., once per second), or whenever new beacon ID data becomes available, for each transmitter 30. Initially, the process identifies the two beacons 32 that currently produce the highest RSSI values. In one embodiment, this determination is made by comparing the RSSI values for the beacon IDs forwarded by the transceiver 30. In another embodiment, this determination is made by the transceiver 30 (e.g., the transceiver only forwards the IDs of those with the highest values).

The pair of beacons is then used to look up the corresponding location or locations in the signal strength table (FIG. 7). If the beacon pair maps to only a single location, this location is stored as the current location and the process is terminated. The current location may be recorded in the database together with a time stamp. If the beacon pair fails to map to any location, the process may likewise be terminated but without updating the location, or possibly by marking the current location as unknown. As indicated above, a greater or lesser number of highest-signalstrength beacons 32 may alternatively be used to determine the transceiver's location. Further, the actual RSSI values could be compared to values stored in the signal strength table.

As further illustrated in FIG. 9, if the beacon pair maps to two or more locations in the signal strength table, the process enters into a loop in which the travel time table (FIG. 8) is used to attempt to eliminate the ambiguity. Specifically, for each possible current location (X=1, 2, . . .), the process determines whether the travel time from the most recent location to the candidate current location is less than the pre-specified minimum. If so, the process eliminates that location as a candidate. As indicated above, the topologic tracking process may also use rules regarding plausible state transitions to resolve ambiguities. For example, if a patient is currently in a patient room, and there is object locator coverage in the hallway outside the room, a direct transition from the patient room to another patient room (without intermediate detection in the hallway) may be treated as suspect or invalid.

Once all of the candidate locations have been evaluated, the remaining location candidates are stored. The identities of the eliminated locations may also be stored for use in subsequent iterations. If multiple locations remain at this point, additional data, such as the RSSI values and the locations eliminated during previous iterations, may be used to predict the most likely location.

With the foregoing process, a transceiver's location becomes initialized automatically, after the device has been turned on, once the beacon pair uniquely maps to a single location. A manual initialization procedure could also be used in which a transceiver's current location is entered into the database "manually." One variation of the above architecture is to replicate the signal strength and travel time tables across the access points 34, and have the access points (rather than a server 38) determine the respective locations of transceivers 30 with which they have connections. The access points could then insert into the real time stream of telemetry data indicators of the patients' locations. Information about a transceiver's current or most recent location could also be passed from one access point 34 to another as part of a hand-off process.

Yet another variation is to store the signal strength and travel time tables within the memory of each transceiver 30, and have the transceivers determine their own respective locations using the general process of FIG. 9. Each transmitter could then transmit its current location on a periodic interval, or whenever a change in location occurs.

The location data determined in accordance with the invention may be used for any of a variety of purposes, including determining the location of a patient in the event of an emergency. In one embodiment, the location data is incorporated into the decision process for establishing and dropping communications links between transceivers 30 and access points 34. For example, an access point 34 may detect or be notified that a particular transceiver 30 is moving out of range of that access point. The access point may use this information to more rapidly drop a connection to that transceiver following loss of communications, and thereby free resources for use by other transceivers 30. An access point could also detect or be notified when one or more transceivers 30 are approaching, and could use this information to appropriately allocate bandwidth to other nearby transceivers.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow.

What is claimed is:

1. An object location tracking system, comprising:
   a plurality of beacons spatially distributed within a building, each beacon transmitting a respective ID signal, the plurality of beacons being generally synchronized with each other based on a phase of an AC power signal within the building, and being programmed to transmit their respective ID signals during assigned timeslots such that transmissions of ID signals for different beacons do not substantially interfere with each other;
   at least one transceiver device which receives the transmissions of ID signals from nearby beacons and determines received signal strengths of such transmissions, the transceiver device adapted to be attached to a movable object, and
   a processing module which uses information reflective of the received signal strengths of the beacon transmissions as received by the transceiver device to determine a current location of the transceiver device.

2. The object location tracking system as in claim 1, wherein the processing module uses a topological tracking method to resolve ambiguities in object location determinations resulting from the information reflective of the received signal strengths.

3. The object location tracking system as in claim 2, wherein the processing module implements the topological tracking method using a table that stores data indicating minimum times for an object to travel between selected locations.

4. The object location tracking system as in claim 3, wherein the processing module determines a current location of the transceiver device by at least:
   identifying a set of beacons that currently produce highest received signal strengths;
   mapping the set of beacons to one or more corresponding locations using data reflective of expected received signal strengths in selected areas of the building; and
   when the set of beacons maps to multiple locations, using minimum travel times read from the table to evaluate the multiple locations as candidates.

5. The object location tracking system as in claim 2, wherein the topologic tracking method uses a set of rules specifying valid transitions between locations.

6. The object location tracking system as in claim 1, wherein at least some of the beacons determine the phase of the AC power signal by monitoring a flicker of lighting within the building.

7. The object location tracking system as in claim 1, wherein the processing module comprises a program executed by a server connected to a local area network.

8. The object location tracking system as in claim 1, wherein the processing module comprises a program executed by a network access point with which the transceiver device communicates by wireless communications.

9. The object location tracking system as in claim 1, wherein the processing module comprises a program executed by the transceiver device.

10. The object location tracking system as in claim 1, wherein the transceiver device receives the transmissions of ID signals from the beacons without becoming synchronized with the beacons.

11. The object location tracking system as in claim 1, wherein the transceiver device is an ambulatory transceiver device adapted to be worn by a patient and to sense and transmit physiologic data of the patient.

12. An object location tracking system, comprising:
a plurality of beacons spatially distributed within a building, each beacon transmitting a respective ID signal;
at least one transceiver device which receives the transmissions of ID signals from nearby beacons and determines received signal strengths of such transmissions, the transceiver device adapted to be attached to a movable object, and
a processing module which uses information reflective of the received signal strengths of the transmissions received by the transceiver device, in combination with a topological tracking method using rules regarding plausible state transitions, to determine a current location of the transceiver device.

13. The object location tracking system as in claim 12, wherein the processing module implements the topological tracking method using table that stores data indicating minimum travel times for an object to travel between selected locations.

14. The object location tracking system as in claim 13, wherein the processing module determines a current location of the transceiver device by at least:
identifying a set of beacons that produce highest received signal strengths;
mapping the set of beacons to one or more corresponding locations; and
when the set of beacons maps to multiple locations, using minimum travel times read from the table to evaluate the multiple locations as candidates.

15. The object location tracking system as in claim 12, wherein the plurality of beacons are generally synchronized with each other based on a phase of an AC power signal within the building.

16. The object location tracking system as in claim 15, wherein at least some of the beacons are configured to determine the phase of the AC power signal by monitoring a flicker of lighting within the building.

17. The object location tracking system as in claim 12, wherein the processing module comprises a program executed by a server connected to a local area network.

18. The object location tracking system as in claim 12, wherein the processing module comprises a program executed by a network access point with which the transceiver communicates by wireless communications.

19. The object location tracking system as in claim 12, wherein the processing module comprises a program executed by the transceiver device.

20. The object location tracking system as in claim 12, wherein the transceiver device receives the transmissions from the beacons without becoming synchronized with the beacons.

21. The object location tracking system as in claim 12, wherein the transceiver device is an ambulatory transceiver device adapted to be worn by a patient and to sense and transmit physiologic data of the patient.

22. A method of detecting a location of a transceiver device that attaches to a movable object, comprising:
with the transceiver device, receiving RF transmissions from beacons that are spatially distributed within a building structure, and measuring received signal strengths of the transmissions;
mapping a set of beacons that currently produce highest received signal strengths; as measured by the transceiver device, to at least one possible transceiver location using data reflective of expected received signal strengths in selected areas of the building structure; and
when the set of beacons maps to multiple possible transceiver locations, evaluate the multiple transceiver locations as candidates using minimum travel times for the object to travel between selected locations.

23. The method as in claim 22, wherein receiving the RF transmission from the beacons comprises monitoring a beacon transmission frequency during TDMA timeslots not used by the transceiver device, said TDMA timeslots being timeslots of a TDMA frame used by the transceiver device to communicate with an access point.

24. The method as in claim 22, further comprising substantially synchronization the beacons to a phase of an AC power signal within the building.

25. A beacon, comprising:
a photodetector that converts light received from an external light source into a corresponding voltage signal;
a phase detection circuit that monitors the voltage signal to detect a phase of an AC power source of the external light source; and
a transmitter that intermittently transmits an RF signal during a time period which is dependent upon the phase of the AC power source as detected by the phase detection circuit.

26. The beacon as in claim 25, further comprising a power supply circuit that converts the voltage signal into a DC power signal used to power at least the transmitter.

27. The beacon as in claim 25, wherein the phase detection circuit comprises an analog-to-digital converter that converts the signal into a digital representation, and a microcontroller that processes the digital signal to detect the phase of the AC power source.

28. The beacon as in claim 25, wherein the beacon is adapted to be externally programmed with a value that specifies the time period.

* * * * *